(12) United States Patent
Lykes et al.

(10) Patent No.: US 10,757,462 B2
(45) Date of Patent: Aug. 25, 2020

(54) INTEGRATING DIGITAL ADVERTISING ECOSYSTEMS INTO LINEAR TV

(71) Applicant: Viamedia, Inc., Lexington, KY (US)

(72) Inventors: Randy Lykes, Lexington, KY (US);
Wendell Decker, Lexington, KY (US);
James T. O'Neill, Bedford, KY (US);
Adam Lynch, Lexington, KY (US);
Paul Cavins, Newburg, IN (US)

(73) Assignee: Viamedia, Inc., Lexington, KY (US)

( * ) Notice: Subject to any disclaimer, the term of this patent is extended or adjusted under 35 U.S.C. 154(b) by 0 days.

(21) Appl. No.: 16/227,160

(22) Filed: Dec. 20, 2018

(65) Prior Publication Data

US 2020/0204847 A1 Jun. 25, 2020

(51) Int. Cl.
| | |
|---|---|
| *H04N 21/2668* | (2011.01) |
| *H04N 21/81* | (2011.01) |
| *H04N 21/234* | (2011.01) |
| *H04N 21/24* | (2011.01) |
| *H04N 21/222* | (2011.01) |
| *H04N 21/845* | (2011.01) |

(52) U.S. Cl.
CPC ..... *H04N 21/2668* (2013.01); *H04N 21/2221* (2013.01); *H04N 21/23424* (2013.01); *H04N 21/2407* (2013.01); *H04N 21/812* (2013.01); *H04N 21/8455* (2013.01)

(58) Field of Classification Search
None
See application file for complete search history.

(56) References Cited

U.S. PATENT DOCUMENTS

2018/0255331 A1* 9/2018 McLean ............. H04N 21/2668
2019/0122659 A1* 4/2019 Miller ................... G06F 16/328

* cited by examiner

*Primary Examiner* — Omar S Parra
(74) *Attorney, Agent, or Firm* — Dergosits & Noah LLP

(57) ABSTRACT

A programmable and universal video serving platform enabling digital ads to be inserted into linear television cable programming feeds. A linear programming feed includes a cue message that indicates a spot for local ad insertion into the programming feed. Detection of the cue message triggers the generation of a VAST protocol ad request from the video serving platform to a digital ad server, the request including programmable fields that are configured to obtain data to generate standard and custom VAST tag information, including audience impression information and distribution platform information as needed. The digital ad server delivers a VAST response back to the video serving platform identifying a digital ad for insertion, and the video serving platform enables playout of the selected digital ad during a designated insertion spot in the programming feed.

32 Claims, 8 Drawing Sheets

INTEGRATING DIGITAL ADVERTISING ECOSYSTEMS INTO LINEAR TV

TECHNICAL FIELD

This disclosure relates in general to advertising for linear video programming, and more particularly, to the selection and insertion of digital advertising content into linear cable television programming.

BACKGROUND

A significant portion of television viewing is linear programming on cable networks (e.g., ESPN, TNT, CNBC). These networks are carried by multichannel video programming distributors ("MVPDs"), which are services that provide multiple television channels to customers through a set top box ("STB") installed at the subscriber's location. Examples of MVPDs include Charter, Comcast, Altice, Cox and others. Linear programming consists of a continuous audio/video feed for the duration of a cable network program or program segment.

The cable networks identify within each linear programming stream available time slots ("avails") for insertion of advertising content ("ads") locally by an MVPD. In a typical scenario, approximately 15 minutes per hour of advertising are filled from national advertising campaigns which run throughout the entire country on that cable network. Another 2-3 minutes per hour are filled with local advertising content, either by splicing the ad content into the programming stream or by stopping and starting the programming stream allowing for local ad insertion gear to fill the time with commercials.

Traditionally, linear ad insertion platforms do not communicate with digital advertising platforms. The standards for communication are distinct to each and do not cross connect. Traditional ad insertion utilizes fixed schedules by network and local avail opportunity for ad playout. Traditional linear ad insertion platforms do not reference or track performance based on impressions sought or delivered nor do they provide any additional dynamic targeting parameters (traditional platforms may provide sub-zone capabilities for hard-wired sub designated market area ("DMA") targeting ability). Typically, 80% of all revenues run on the "top" 20 to 25 cable networks. However, when over-night inventory is accounted for, the sell-thru percentage on the top 20 to 25 cable networks is significantly reduced, meaning that there is a substantial amount of "unsold" avails and substantial incremental opportunities for targeted audience-centric marketing.

Thus, the growth of traditional cable television advertising has been flat as advertisers have moved their resources to take advantage of the growing consumer demand for digital media, along with the ease of placing digital ads on websites through digital ad exchanges and through programmatic platforms onto desktops, laptops, and mobile devices. Almost any digital ad server can place an ad on any platform based on data to target the right consumer. In addition, digital technology enables the ability to use data to hyper target the right audience in filling advertising avails. This ability to hyper-target the right "audience" on any digital media property without a preset schedule and only paying for the actual impressions or impression counts, which are accurate to industry standard acceptance, and thus maximizing ad spending, is why digital advertising revenues have grown exponentially, along with the increase in digital video consumption.

For television advertising placement to work as effectively and efficiently, the MVPDs and their advertising partners must address legacy standards and technology.

The Society of Cable Telecommunications Engineers ("SCTE") has promulgated a relevant standard, SCTE 35, for defining a "cue message" to specify how to fill the avails in the programming television stream, entitled Digital Program Insertion Cueing Message for Cable (2016). SCTE 35 is the core signaling standard for advertising and distribution control of content for content providers and content distributors, and thus, SCTE 35 cue signals are incorporated into the programming feed and used to identify advertising breaks and programming content. In addition, virtually all content providers regularly publish their programming schedules, and more importantly for advertising purposes, the commercial break structures for programs, which may be used to create corresponding linear television schedules.

For online digital advertising, the Interactive Advertising Bureau has set a standard specification for communications between digital ad servers and digital video players called the Video Ad Serving Template ("VAST"). Thus, digital ads served according to the VAST protocol can be played by any digital video player.

However, since MVPDs may utilize different platforms of hardware and software for distribution of the program content, in general they do not utilize the infrastructure required for generating or processing VAST ad calls. In that case, a VAST tag must be specially configured and integrated in the ad insertion infrastructure to allow distribution on a particular distribution platform. The differences in distribution platforms, evidenced by use of different operating systems and set top boxes, presents a measure of difficulty for inserting ads for different MVPDs. Therefore, it would be desirable for an online digital ad serving network to be able to use standard digital ad insertion workflows to access the MVPD's television inventory. Having the capability to serve ads universally onto a variety of different television distribution platforms would enable digital ad serving exchanges to be applied to the ad avails in linear programming of cable TV networks, as well as to over-the-top ("OTT") platforms such as Hulu, Netflix and SlingTV, and privately-managed IPTV networks, without having a preset schedule of breaks. This would enable more avails in linear TV programming to be bought, sold, and measured, and combined with the ability of data processing to utilize audiences as the target and ad impressions as the currency, such an improvement would effectively integrate the linear and digital video advertising ecosystems. This capability would also increase the potential revenues for addressable advertising, namely, sending an individual ad to an individual set top box based on audience targeting data.

DETAILED DESCRIPTION

Figure 1:
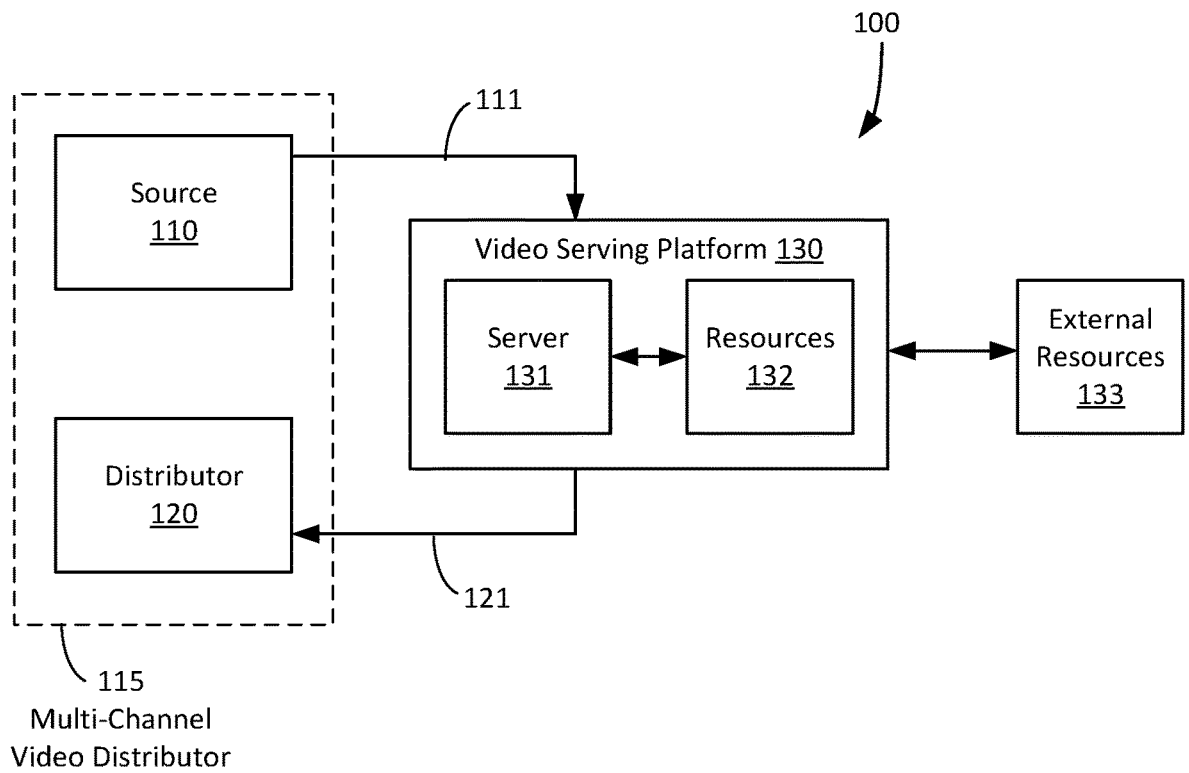
FIG. 1 is a block diagram illustrating a first embodiment of a system for inserting ad content into a linear programming stream.

FIG. 1 illustrates a simple schematic representation of a system 100 for inserting digital video advertisements ("ads") into available spots ("avails") that are designated for content insertion in a linear cable television programming stream. A linear programming stream is one that is continuously broadcast from start to finish of the program, such as regular episodes of a television series or a news broadcast, or a live event such as a sports broadcast. Many if not most avails in linear programming or high profile linear programming (such as sports events or special events) are filled by national advertising campaigns, but typically avails are made available for local cable providers to insert local advertising at their head end.

The linear programming stream 111 originates from a source receiver or server 110, typically a multi-channel video programming distributor ("MVPD"), and is provided as an input to a video serving platform 130. The video serving platform 130 detects a message, called a "cue" herein, that is embedded within the linear programming stream 111 and which identifies a local ad insertion break that is coming up in the linear programming stream. In some embodiments, the cue may be called a cue message, or a cue tone, or a tag, but in any event the cue is an indicator that signals to video distributors, such as cable television headends, that an avail is coming, and providing details of the avail.

Upon detecting the message identifying an avail, the video serving platform 130 requests encoded (CALM compliant) digital video content to insert into the avail. The request includes the location of the avail in the programming stream, usually the time that the avail will start and end, or the start time and the duration. In one embodiment, the video serving platform 130 includes a first video server 131 that includes a configuration as an ad splicer to insert or splice the digital content into the linear programming stream 111 at the designated avail, as well as internal resources 132, such as one or more additional servers, configured to store digital content, to serve digital content, and to make decisions about appropriate digital content to insert into avails.

There may also be external resources 133 to provide various of these functions. For example, an estimate regarding the number of televisions tuned to a particular program or channel during the ad presentation is useful and desirable as a criteria for selecting the appropriate digital ad content to insert into the avail, and such viewer information may be provided by a third party audience measurement service or via the MVPD's own media management platform including the MVPD's aggregation of tuning (viewing) information from set top boxes or servers in its distribution network. Advantageously, actual viewing information is available after the ad has been inserted, and the third party service or the MVPD media management platform can provide information that confirms an actual count of impressions served for a particular ad insert for billing purposes. As another example, the ad decisioning network may be external to the video serving platform 130.

The result of seamlessly generating a VAST request for digital content from a linear programming stream is that online digital ad servers, such as Google Ad Manager, Freewheel, Cadent/Blackarrow, Atlas (Amazon), Appnexus, OpenX and others, can now serve a digital ad into traditional TV distribution platforms without replacing set top boxes or adding firmware.

It is noted that the term "video serving platform" is used in the embodiment of FIG. 1 and is intended to define an integrated platform, comprised of multiple components including a video server and/or an ad splicer, that can perform all the steps required for ad insertion within the integrated video serving platform, including detection of a cue message in the linear programming stream, the generation of an ad request for digital content incorporating information from the cue, the preparation of a VAST response to the ad request, and the serving of digital content identified in the response into the linear programming feed. However, the term "video server" is also used in this description and could be used interchangeably with video serving platform, but more typically will describe a server with less than all of the ad serving features integrated into a single device or related group of devices, but acts as the controller or manager of ad insertion operations. The term "ad splicer" is also used and also refers to a server, but more typically will have and provide more limited features than a video server or a video serving platform.

Figure 2:
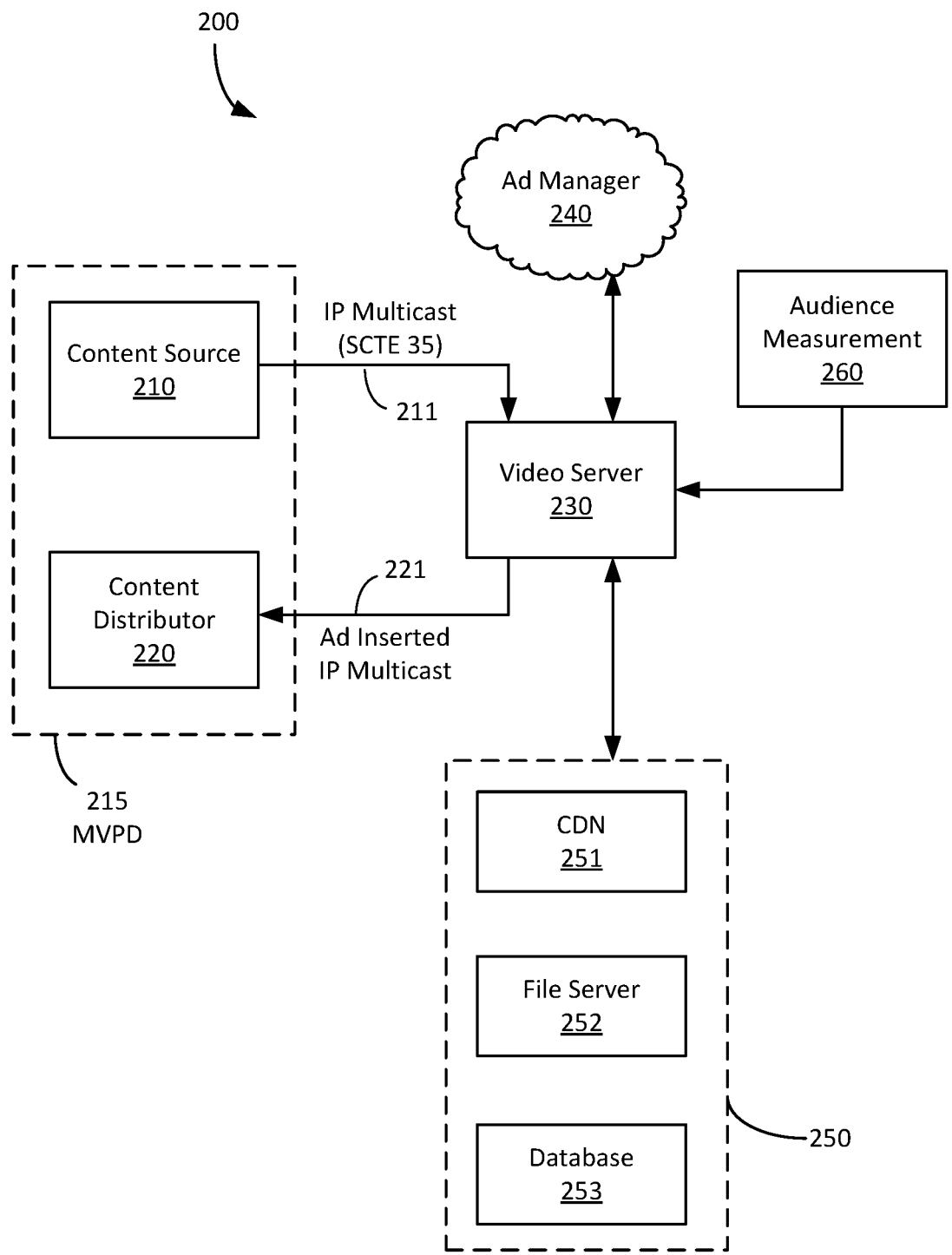
FIG. 2 is a block diagram illustrating a second embodiment of a system for inserting ad content into a linear programming stream.

Referring now to FIG. 2, a more detailed embodiment of a digital ad insertion system 200 is illustrated. In this system 200, a content source 210 provides one or more linear programming streams 211, which in one embodiment are IP multicasts formatted in accord with SCTE 35. A content distributor 220 is the destination of the linear programming feed, once it has been modified to include an inserted ad as feed 221. The content source 210 and the content distributor 220 may be part of the same multi-channel video programming distributor ("MVPD") 215 or they may be separate MVPDs. Examples of MVPDs can include common subscription television networks available via cable or satellite, such as Comcast, AT&T, Cox, Charter, CenturyLink and others.

Digital ad insertion into the linear programming stream is performed by an ad splicer as part of the video server 230 and decision making for digital ad insertion is performed by an ad manager 240. The video server 230 and the ad manager 240 are typically separate computing units providing multiple functions, but may be integrated together in a single video ad server platform, as illustrated in FIG. 1.

The video server 230 is also in communication with other resources 250, 260 that facilitate decision making with regard to ad targeting and ad selection. For example, the resources 250 can include a content delivery network 251, a file server 252, and a performance database 253, and each of these resource components may be part of an integrated video serving platform with the video server. The content delivery network 251 is dedicated to transmitting requested digital ad content to the video server 230 for insertion into the linear programming stream in accordance with the ad request. The file server 252 stores previously encoded digital ads that are available for selection and insertion as well as post-insertion verification data collected periodically. The database 253 gathers and stores data from all the processes, from which performance reporting and invoicing for executed advertising campaigns can be generated, for example.

All of the components described herein may be implemented using conventional computer-based servers, programmed with instruction sets to realize the various features.

In one embodiment, the video server 230 includes programming features that are useful in constructing an ad request, in particular, by providing a configurable data field in the VAST request that can be used to pass ad targeting parameters and other important information. Programmable fields in the VAST request may include (i) specification of ad rules, i.e., whether to follow the VAST workflow or a different ad rules workflow; (ii) identifying the content source (like video on demand "VOD"); (iii) listing the specific video identifier (such as a specific VOD asset; for example, someone wants to advertise on all John Wayne movies); (iv) including key-values (such as: daypart ads, DMA, zip code, genre, age, gender, income, etc.); (v) identifying fall-back ad data—if the primary ad is not available, the ADS can send multiple responses based on priority); and (vi) providing instructions to handle any issues that arise under the Children's Online Privacy Protection Act of 1998 ("COPPA"); to name just a few.

Ad splicers and ad insertion servers are generally well known, such as those made by Arris, RGB, Imagine, SeaChange, Culloma Technologies Ltd., Digital Adware, TelVue, and others.

For example, any video player can seamlessly play digital ad content if instructed by a properly constructed VAST response to an ad request. Thus, the process starts with the ad request, which is triggered by including a "cue" in the linear programming stream, such as a SCTE 35 cue message. The cue signals that an avail is coming up within the linear programming stream, and passes parameters for inserting content into the avail, such as the start and end time, or the start time and the duration. The relevant standard for constructing a cue message for a linear programming stream can be found in SCTE 35 (see https://www.scte.org/SCTEDocs/Standards/SCTE %2035%202017.pdf), incorporated herein by reference.

Once the cue message is detected by the video server 230, an ad request is generated and sent to the ad manager 240 for decision making with regard to selection of digital content for insertion. The ad request is constructed as a data packet with a number of required and optional fields for passing parameters to the ad manager, such as program identification, program type, avail start time, and avail stop time. In one embodiment, the data packet can be constructed to include one or more configurable data fields that can be filled by the video server 230. For example, the video server can obtain estimates related to viewing audience for the avail in terms of number of impressions, demographics, psychographics, consumer purchaser information, etc., from a third party audience measurement service 260 or from the aggregation of tuning data from an MVPD, and provide those estimates to the ad manager 240 as a key parameter for ad targeting.

Once the ad request is received by the ad manager 240, the ad manager identifies a digital ad that meets the parameters of the request, then prepares a VAST response and sends the response back to the video server 230 for handling the insertion. The relevant standard for constructing a VAST response be found on the Interactive Advertising Bureau website (see https://www.iab.com/guidelines/digital-video-ad-serving-template-vast/), incorporated herein by reference. For instance, the cue message for a specific ad break (time/duration and program) on a specific network (like HGTV) will be read by the video server 230, then associated servers 250 will be polled and the associated data included in the VAST request. The video server 230 and/or video server resources 250 will then query other data bases as appropriate, such as the viewer measurement server 260, to acquire the number of STB's tuned to this network as this time, and other databases as possible and relevant to further define the targets for the break and to complete preparation of the VAST request.

The video server 230 will, as needed, retrieve the identified digital ad from storage and send it to its ad splicer component, which will directly insert the file into the linear programming stream at the designated ad insertion point.

In one embodiment, the ad manager 240 is a local instance of Google Ad Manager, but this decisioning unit could be implemented using technology from Cadent, Freewheel, or other ad decisioning platforms. An example of how to how to prepare a master video tag with Google Ad Manager for retrieving video ads in provided at the Google Ad Manager Help (see https://support.google.com/admanager/answer/1068325?hl=en). An example of in-stream ad insertion is also described in U.S. Pat. No. 8,738,787 entitled Ad Server Integration, which is incorporated herein in its entirety. Other embodiments can include other digital ad servers.

Data regarding audience measurement of actual viewing and viewer demographics is obtained from a third party audience measurement service 260 such as Nielsen, Comscore, or other companies that aggregate subscriber tuning (viewing) data, or even the MVPD itself, which may have the ability to aggregate tuning data from its set top boxes or servers. For example, a critical question for an advertising campaigns is how many viewers are tuned to (watching) a particular program at a particular time. The server of the measurement system can provide an estimate of the number of ad impressions expected to be delivered by an ad insert prior to the ad selection decision. The audience measurement system can also identify the type of program (available from published schedules) and when combined with other audience data sets, include additional viewer demographic information such as age, gender, geographic location, and psychographics, or even what kinds of products that consumer purchases in stores. The ad targeting criteria can then be established and placed into the configurable data field of the ad request using well known methods.

The audience measurement service or the MVPD that collects tuning data may also provide an actual count of impressions delivered after the ad insertion for purposes of reconciling with the forecasted impression load.

Figure 3:
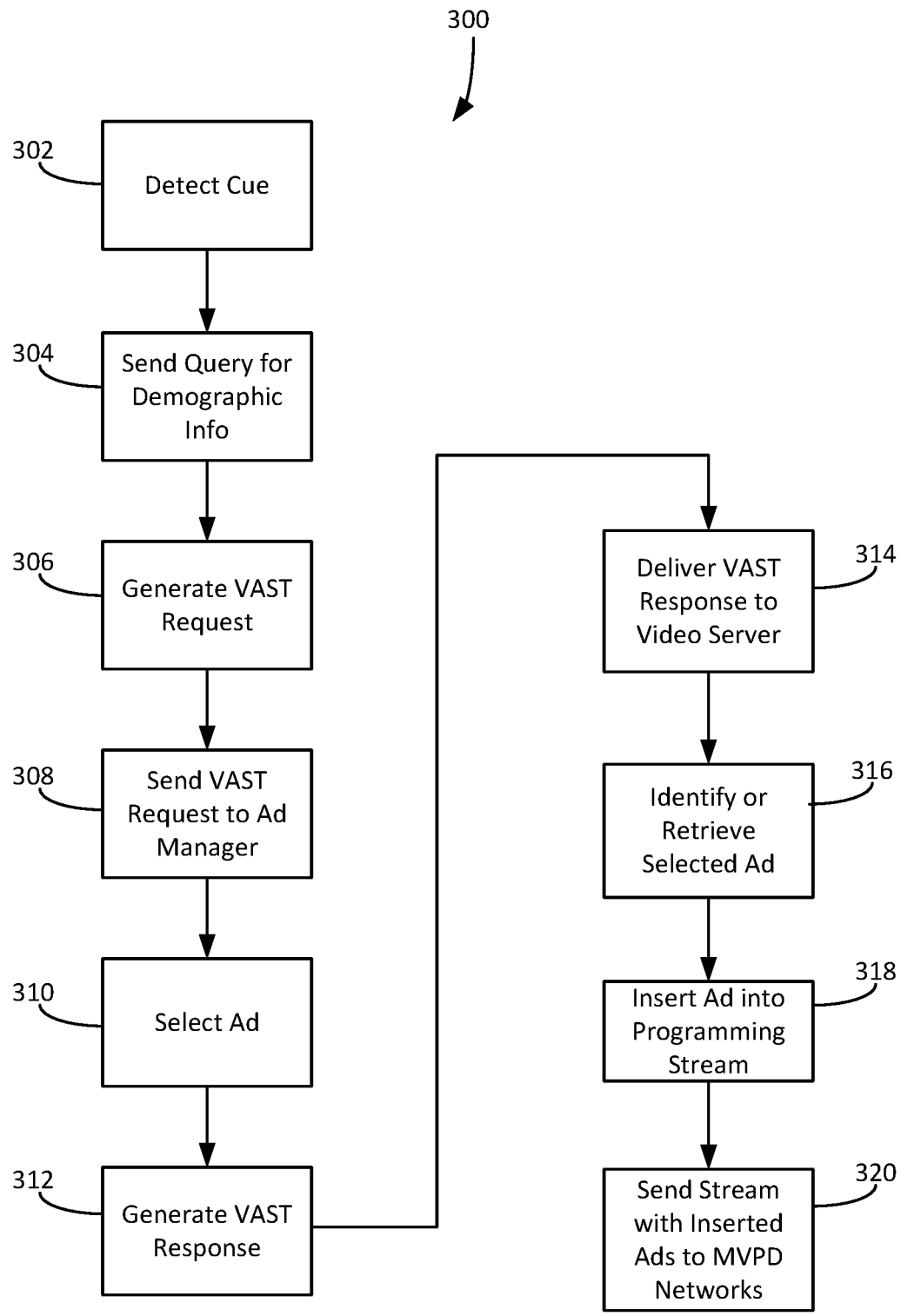
FIG. 3 is a flow chart illustrating a process for inserting ad content.

Referring to FIG. 3, a process 300 for inserting ads in video streams is illustrated. In step 302, a cue message is detected in the video stream received at the video server/ad splicer. The cue message is formed in accord with SCTE 35 and provides information regarding the location of the ad spot(s) in the video stream, such as the time point the ad spot starts in the video stream and the duration, although different providers may generate different formats for the cue message. For example, an SCTE 35 cue message is usually a binary message encoded in Base64, and consists of a data packet with a number of fields that are used to describe attributes of the cue message. Although process 300 addresses a single cue message, in reality, a large number of cue messages are received in multiple programming feeds from multiple content providers.

In step 304, after detecting a cue message, the video server sends a query to obtain audience information for ad targeting, for example, an estimate of how many viewers are tuned to the channel for this programming feed at the requested time for ad insertion. Such information may be available from a third party service. For example, some media measurement companies and MVPDs themselves may have an automated STB measurement/tracking solution that knows what every set top box in its network is tuned to and can therefore estimate how many ad impressions can be delivered at a particular time for a particular program. Other providers have additional useful information regarding customer viewing or purchasing habits, such as Experian, Nielsen Data Plus Math, Samba TV, iSpot.TV and others.

In step 306, a VAST request is generated to include configurable data fields as needed and appropriate. The VAST request is an XML data structure that indicates to the ad serving network when the ad avails will occur in the video stream and the duration of the avails. The demographic information or any ad targeting information can be added to the configurable data field to provide ad targeting criteria. The programmer's video commercial format is typically known from a periodic schedule distributed by the various content providers.

In step 308, the VAST request is sent to an ad manager for ad decisioning. For example, Google Ad Manager provides a variety of features for managing ad insertion, and may be implemented in a customized, local instance. In step 310, the ad manager selects or identifies an ad that meets the targeting criteria. The ad must be approved to play over the MVPD's network, and typically the video file has been prepped for playout on the MVPD's network, to include compliance with various advertising regulations and guidelines, including CALM compliance.

In step 312, the ad manager generates a VAST response to the VAST request, which describes the ad that should be played. The selected ad may be identified by providing a link to the ad location, or by actually retrieving the ad from local storage on the video server 230 or external resource 250. In one embodiment, the selected ad is identified by the ad manager in step 314 and the VAST response is delivered to the video server 230 in step 316. In another embodiment, the selected, pre-approved ad is retrieved by the video serving platform 130 after receiving the VAST response that identifies the (out of local network) location of the selected ad. The ad is then retrieved, encoded, distributed and stored in the Media Serving Platform for playout upon next request.

In step 318, the ad splicer inserts the selected ad into the video stream. Finally, in step 320, the modified video stream with inserted ad is transmitted to the various MVPD networks that are configured to display that video format. Thus, process 300 allows digital ad content to be inserted into any type or format of digital video stream, from any content source to any content distributor, whether cable TV, satellite TV, IPTV, or OTT.

Figure 4:
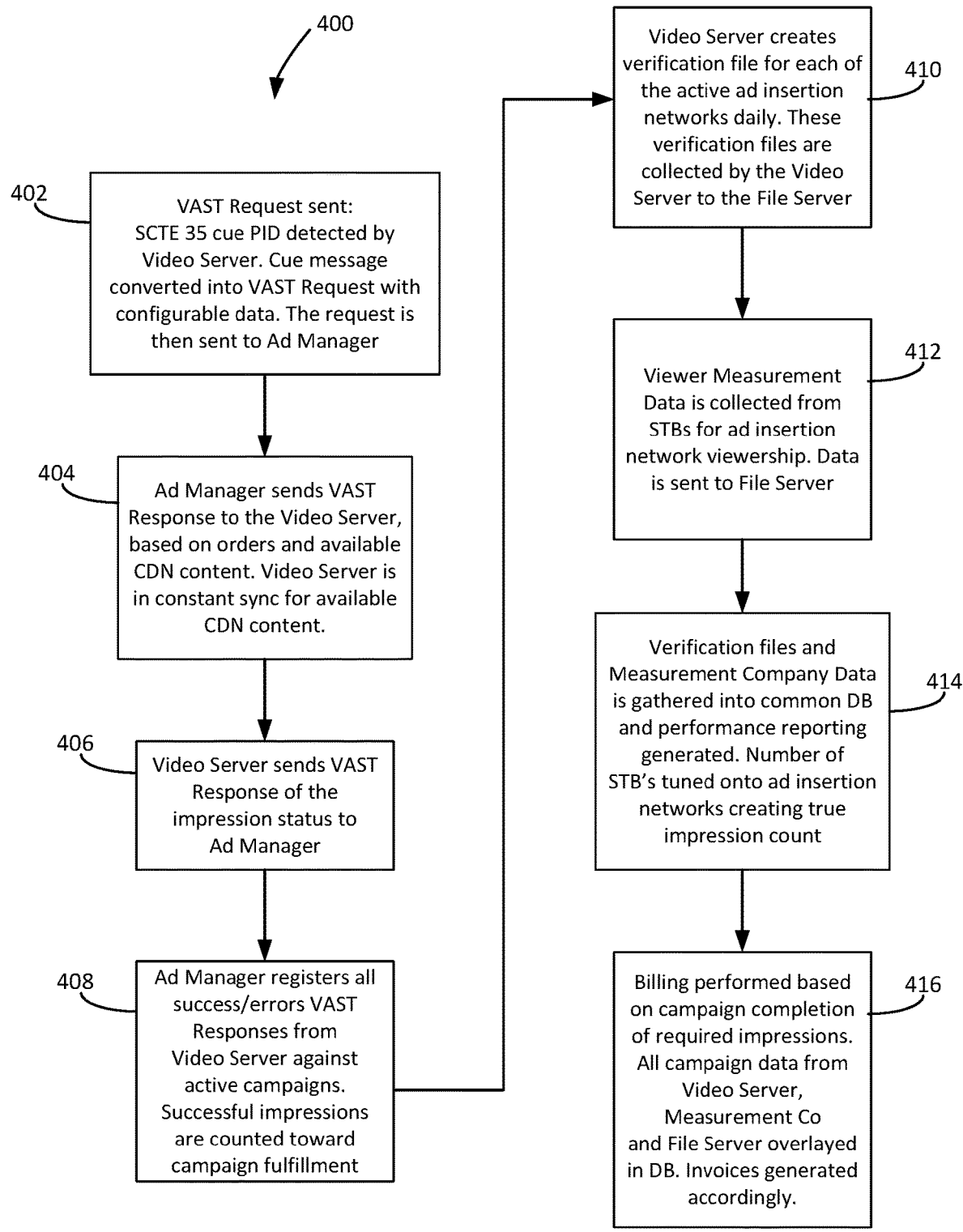
FIG. 4 is a flow chart illustrating another process for inserting ad content.

Another process 400 for inserting ads is illustrated in FIG. 4, with reference to the system 200 of FIG. 2. In step 402, the cue message in the linear programming stream is detected by the ad splicer/video server 230, and the cue message is used to generate a VAST request having configurable data, which is then sent to the ad manager 240. In step 404, the ad manager 240 sends a VAST response back to the video server 230. The response includes ad targeting based on audience viewer information, and the response is also based on customer orders and availability of content, e.g., from storage in the CDN server 251. The video server 230 is in constant sync with the CDN server 251 so as to have current knowledge of the ad availability.

In step 406, the estimate of audience impressions, included in the VAST response, is uploaded to the ad manager 240. In step 408, the ad manager registers all successes and failure of ad insertion at the video server 230. Successful impressions are counted toward ad campaign fulfilment.

In step 410, the video server 230 periodically creates a verification file for each of the active ad insertion networks, e.g., daily. The verification files are collected into the file server 252.

In step 412, viewer measurement data is collected from the set-top-box ("STB") of each and every customer, and this information is sent to the file server 252. In step 414, the viewer measurement data and the verification files are sent to the database 253 and performance reporting is generated. The actual verification and reporting of impressions served may come from a third party audience measurement service or from the aggregation of tuning data from an MVPD. For example, the number of STBs tuned to the inserted ad represents the true impression count.

Finally, in step 416, billing for ad insertion is performed based on campaign completion of required impressions. Relevant data is collected into the database 253 from the ad manager 240, the resources 250, and the viewer measurement server 260, and a final count of impressions served may be obtained from a third party measurement service or from the aggregation of tuning data from an MVPD.

Figure 5:
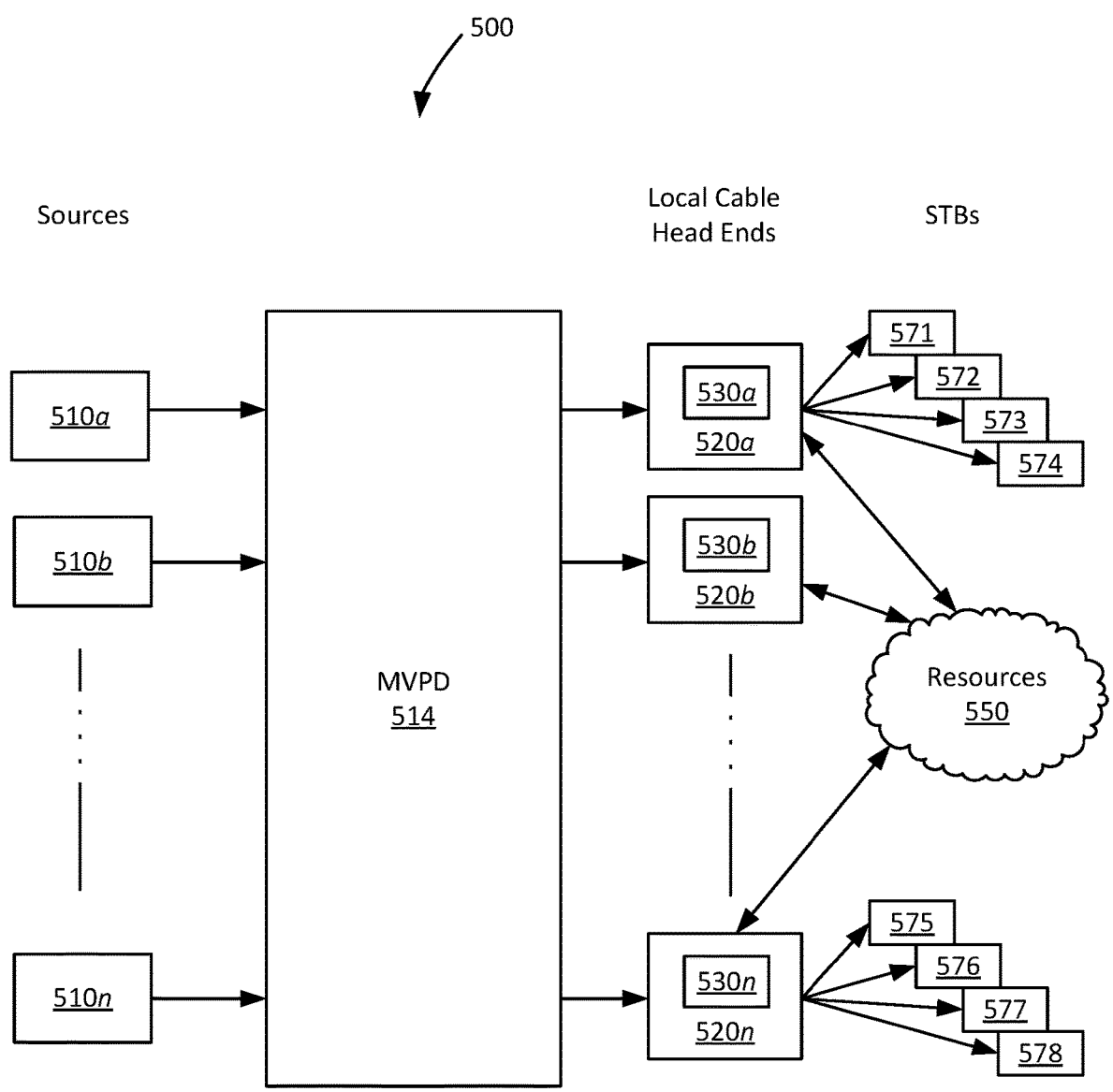
FIG. 5 is a block diagram illustrating a third embodiment of a system for inserting ad content into a linear programming stream.

An alternative embodiment showing system 500 is illustrated in FIG. 5. In this embodiment, a number of different content sources 510a through 510n provide programming feeds for MVPD 514. The MVPD distributes its programming feeds to the head ends 520a through 520n of local cable providers, which in turn send their programming feeds to individual STBs 571-578, for example.

Incorporated within each head end 520a through 520n of the local cable providers are video serving units 530a through 530n, respectively. Further, resources 550 are available to each head end to provide the services and features found in the ad manager, CDN, file server, database, and viewer measurement server, as described above. The video serving units 520a-n are configured to detect a cue message in the respective linear programming feed, and to receive a VAST request incorporating ad insertion location from the cue message and audience-based ad targeting information from the resources. A VAST response is then generated to fill avails as described above.

As noted above, digital ad serving technology has provided the ability to hyper-target the right audience in filling digital advertising requests by providing much more detailed targeting criteria. For example, in addition to providing knowledge of the basic demographics, such as gender, age income, location, education, psychographic, etc., digital technology can provide many other types of consumer preference data, including behavioral data such as past purchasing history or browsing history; dayparting data, i.e., the particular time(s) of the day that the consumer is active; designated market area (DMA); and other forms of data mining that may be helpful in designing ad targeting criteria.

The universal nature of the video serving platform described herein enables it to work in a multi-cast environment (one video feed to many STB's) or a uni-cast environment (one video feed to one STB). Because digital technology currently allows STBs to be individually addressed, there is an opportunity in the uni-cast MVPD environment to send an individual ad to an individual STB that is "requesting" the ad, based on hyper-targeting audience criteria. This opportunity benefits from the viewer's interaction with various data sources that help to define the individuality of the viewer from a marketing perspective, thereby enhancing the ability to hyper-target the individual viewer. Thus, addressable advertising provides another opportunity for potential advertising revenues.

Figure 6A:
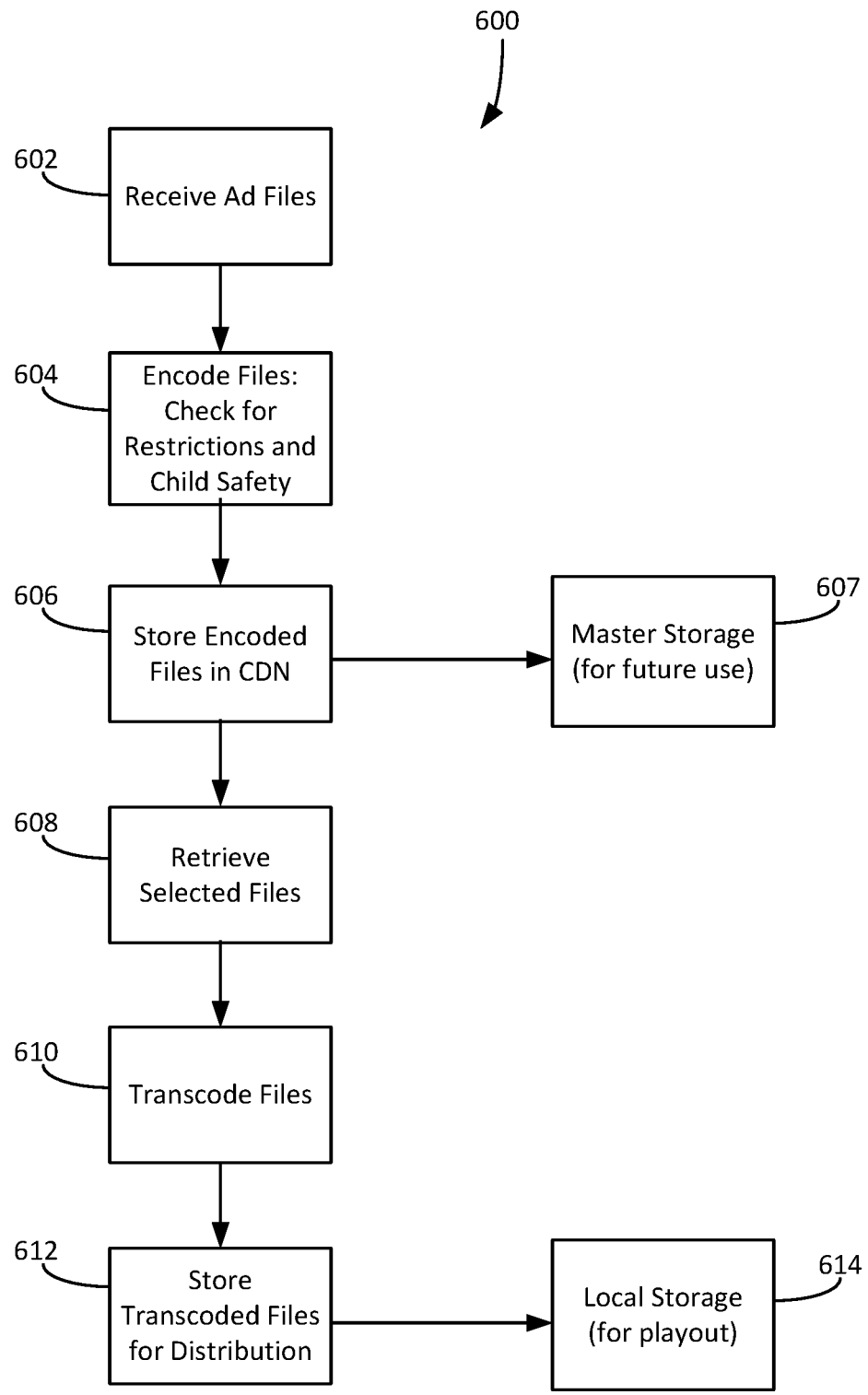
FIG. 6A is a flow chart illustrating a process for preparing an inventory of digital ads.

The ads to be inserted are (obviously) produced ahead of time by advertisers, provided to the ad serving network and stored for future use. A process 600 for receiving and storing the ads is illustrated in FIG. 6A. In step 602, ad files are received into the ad serving network, each file is encoded in step 604 and stored in the file server in step 606 and also stored to a master video file server in step 607 for future advertising needs. Files are retrieved in step 608. In step 610, the files are transcoded to the format of one or multiple specified content distributors. For example, the ad file may be converted from an MPEG2 source (commonly used in broadcast TV) to H.264 (MPEG4) video and AAC audio (common for streaming content). In step 612, the transcoded files are stored in the file server and available for selection and, in step 614, the transcoded files are sent to the local storage on the Media Serving Platform and available for ad insertion.

In one embodiment, a single ad spot may be transcoded into a number of different video formats such that the same ad (stored in different formats) can be provided to different content distribution networks.

Prior to storing ads for future use, each ad is reviewed for compliance with relevant regulations and guidelines. For example, each ad is reviewed to determine whether it contains salacious material, such as references to porn, guns, drugs, etc. Further, the video quality is reviewed, as well as any competitive risk posed by the ad. In addition, all ads must comply with the Commercial Advertising Loudness Mitigation ("CALM") provisions regarding audio volume.

Once ads are prepared, they may be sent to the video server or to a video cache or CDN. Low priority ads, overflow ads, and potential ads may be stored in a content distribution network coupled to the video server, and upon the first request for an ad by the ad decisioning server, the ad is pushed to the edge video server.

Ads may also be aggregated by a supply side platform ("SSP"), such as Adx, Freewheel, or Placemedia, that talks to the ad decisioning network. The SSP can aggregate ad inventory from any of the major MVPDs, such as Comcast, Charter, Altice, Cox, and others. The SSP can also receive instructions as to what ad inventory is available, for which networks, and for what time slots (for example, an MVPD may exclude prime time and the top 20-25 networks). Finally, the SSP can talk to a demand side platform ("DSP"), such as Trade Desk, Appnexus, Simplifi, Tube Mogul, and others, to engage is bidding for ad slots between the SSP and the DSP.

Figure 6B:
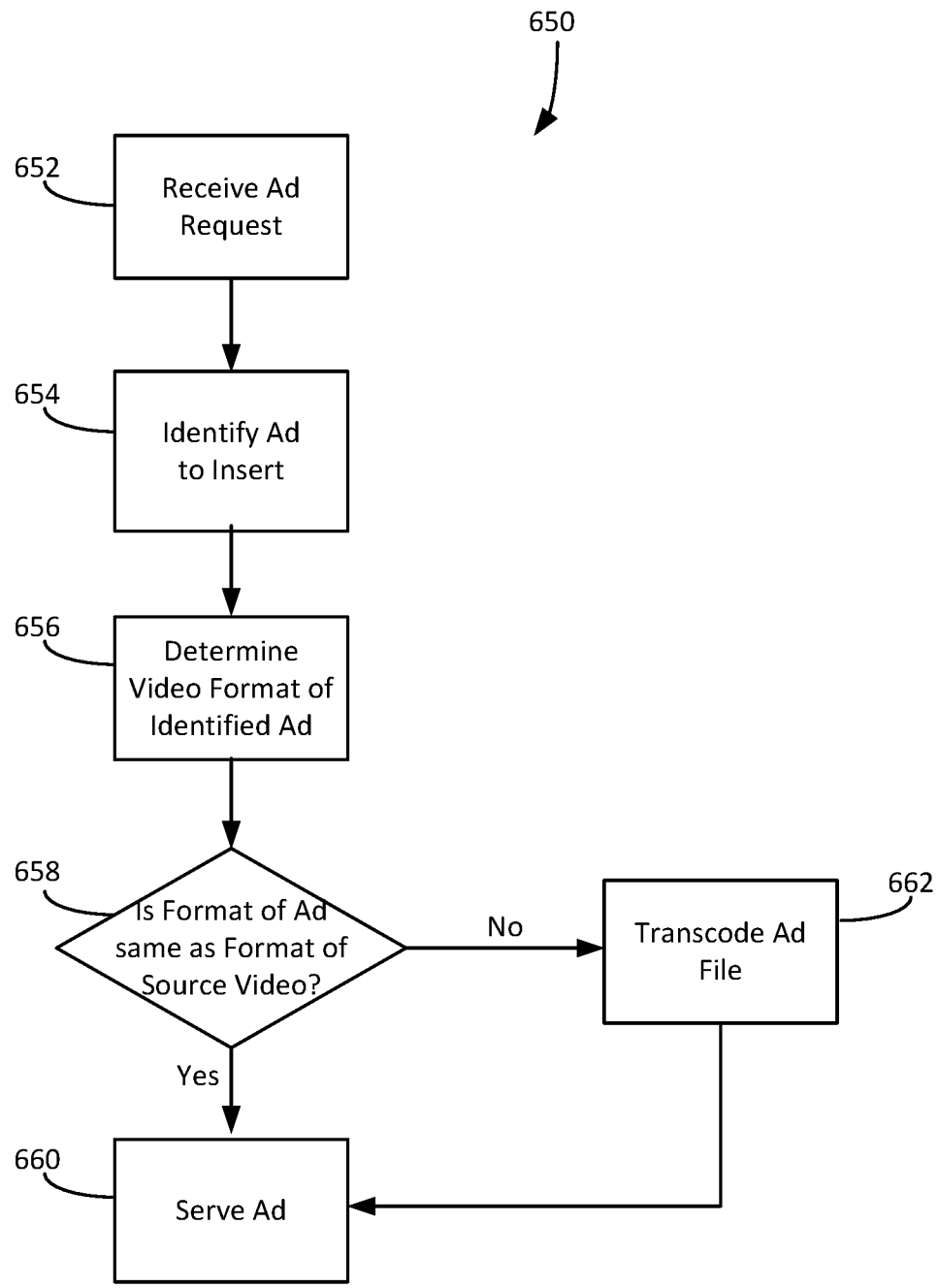
FIG. 6B is a flow chart illustrating a process for preparing a digital ad on the fly.

An alternative process 650 is illustrated in FIG. 6B. In step 652, an ad request is received at the ad serving network. In step 654, a suitable ad is identified, and in step 656, the video format of the identified ad is determined. If, in step 658, the video format of the identified ad is the same as the video format of the video stream that requested the ad, then in step 660, the ad is delivered. If the video format of the identified ad is not the same as the source video format in step 658, then the ad is transcoded on the fly in step 662 and then delivered in step 660. Typically, the location of the ad break in the digital stream is known at least a few seconds ahead of time, either in timing of the cue or, in the case of a "splice immediate" value in the cue message, with a configured buffer, in effect giving more time to complete the processes, thereby permitting a seemingly "live, real-time" ad insertion.

While the processes described above present a time-based ad insertion solution, it is also possible to have an event-based solution such as a live sporting event, and the cue message will include information to define the event and the ad insertion points.

Figure 7:
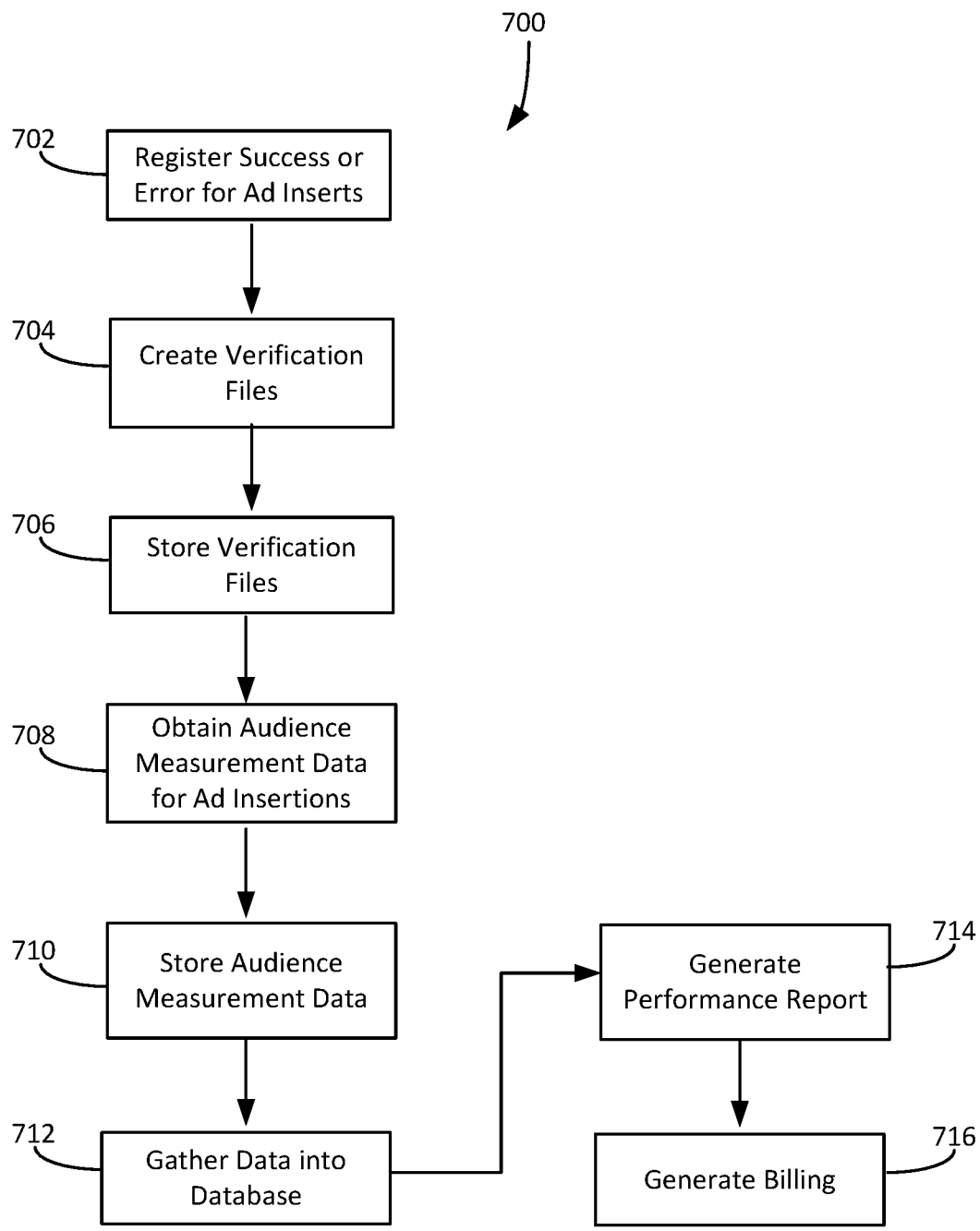
FIG. 7 is a flow chart illustrating a process for counting impressions to generate billings.

Turning now to FIG. 7, a process 700 for verifying and counting the number of impressions actually delivered is illustrated. In step 702, the ad serving network counts and registers all successful and unsuccessful ad inserts based on the responses from the video server. In one preferred mode, all successful impressions are counted towards a particular advertising campaign fulfillment. In step 704, verification files are created and periodically aggregated (e.g., daily) for each of the active ad insertion networks. The verification files contain information describing which ads were inserted into which networks, at what times. The verification files are stored in the file server in step 706.

In step 708, actual tuning (viewership) data related to the ad inserts is obtained, usually from a third party service that measures actual viewing on STBs, for example. The viewership data indicates how many devices are tuned to a particular program, and for how long. This data provides a count of impressions delivered, and can also provide the demographic characteristics of the viewers. In step 710, the measured tuning (viewership) data is stored in the file server.

As an alternative, the verification files may be shared with the third party service, which then obtains and stores the relevant audience measurement data and returns the data to the ad serving network.

In step 712, the verification files and the viewer measurement data are gathered into a common database, and may be used to generate performance reports in step 714. For example, the combination of the verification data and the viewer measurement data provides a true count of the impressions actually delivered.

Finally, in step 716, billing to advertisers is generated based on the true count of impressions actually delivered for a particular ad campaign.

The foregoing description has been presented for the purpose of illustration and description. It is not intended to be exhaustive or to limit the disclosure to the precise form disclosed. Many modifications and variations are possible in light of the above teachings. It is intended that the scope not be limited by this detailed description, but by the claims and the equivalents to the claims appended hereto.

The invention claimed is:

1. A method, comprising:
    detecting, by a video server, a standard-compliant cue message in a linear programming feed received from a multi-channel video programming distributor (MVPD), the cue message indicating a local ad insertion break in the linear programming feed for inserting an ad and also indicating ad insertion parameters for the ad insertion break;
    generating, by the video server, a VAST request for an ad to insert into the ad insertion break based on the cue message, the VAST request having data fields that are configured to include audience information;
    receiving, by the video server from an ad decisioning system, a VAST response identifying a first ad on the basis of the audience information, the ad insertion parameters, and relevant ad campaign information; and
    serving, by the video server, the identified first ad into the available ad insertion break in the linear programming feed indicated by the cue message.

2. The method of claim 1, further comprising:
    upon detecting the cue message, obtaining, by the video server from an audience measurement service, the audience information.

3. The method of claim 2, further comprising:
obtaining, by the video server from the audience measurement service, the audience information as an estimate of impressions that will be delivered during playout of the first ad.

4. The method of claim 2, further comprising:
obtaining, by the video server from the MVPD, the audience information as an estimate of impressions that will be delivered during playout of the first ad.

5. The method of claim 1, further comprising repeating the steps of claim 1 for a plurality of linear programming feeds thereby serving a plurality of ads into respective linear programming feeds.

6. The method of claim 4, further comprising:
generating, by the video server, a verification log identifying which ad ran on which programming feed at which ad insertion break;
obtaining, by the video server from the audience measurement service, an indication of actual impression data for each served ad; and
generating, by the video server, a verification file that incorporates the verification log, the actual impression data, and the relevant ad campaign information.

7. The method of claim 1, wherein the audience information includes number of impressions, applicable zip codes, and audience demographics including age, gender and income.

8. The method of claim 1, wherein the ad insertion parameters include networks, ad start times, ad stop times, program genre.

9. The method of claim 1, wherein the VAST request includes a plurality of configurable data fields, the generating step further comprising providing, by the video server, ad targeting parameters in one of the configurable data fields.

10. The method of claim 1, wherein the VAST request includes a plurality of configurable data fields, the generating step further comprising providing, by the video server, workflow rules in one of the configurable data fields for ad selection and serving.

11. The method of claim 1, further comprising:
providing, by an external source, a plurality of ads to storage accessible to the video server including the status of the availability of each ad for the ad decisioning system.

12. The method of claim 11, further comprising:
reviewing the plurality of ads for compliance with relevant ad guidelines.

13. The method of claim 12, wherein the reviewing step including reviewing the ads for salacious material, video quality, competitive risk, and commercial advertisement loudness mitigation (CALM).

14. The method of claim 11, wherein the external source for ads is the MVPD or its sales agent.

15. The method of claim 11, wherein the external source for ads is a content distribution network.

16. The method of claim 15, further comprising:
pushing the first ad from the content distribution network to the video server when the first ad is identified in the VAST response and the ad is not resident on the video server.

17. The method of claim 1, further comprising:
aggregating a plurality of ads from a supply side platform.

18. The method of claim 17, further comprising:
aggregating the plurality of ads from a plurality of MVPDs.

19. The method of claim 17, further comprising:
receiving information from a plurality of MVPDs regarding ad insertion breaks for a plurality of linear programming feeds and availability of ads for insertion into the ad insertion breaks; and
providing instructions to the supply side platform regarding the ad insertion breaks and availability of the ads in the respective linear programming feeds of the plurality of MVPDs.

20. The method of claim 17, further comprising:
receiving, at the ad decisioning system, bids for serving ads between the supply side platform and from a demand side platform.

21. A system for inserting ads into a linear programming feed, comprising:
a cable television head-end configured to receive a plurality of linear programming feeds from a multi-channel video distributor (MVPD) and to distribute the plurality of linear programming feeds to customers through set top boxes installed at subscriber locations;
a video serving component in communication within the head-end and having a plurality of input channels, a plurality of output channels, and a processing unit;
each input channel configured to receive a respective one of the plurality of linear programming feeds and to detect a standard-compliant cue message in the respective one of the plurality of linear programming feeds, the cue message indicating an available ad break and corresponding ad insertion parameters in the linear programming feed for use by the head-end to select and insert advertisements;
the processing unit configured to, upon detecting the cue message, generate a VAST request for an ad to insert into the ad break based on the cue message, the VAST request including data fields that are configured to include audience impression information;
the processing unit further configured to receive, in response to the VAST request, identification of a plurality of ads for insertion into respective ad breaks based on respective ad insertion parameters, audience impression information, and relevant ad campaign information for each of the plurality of linear programming feeds, and to insert one of the respective identified ads into a respective one of the linear programming feeds; and
each output channel configured to transmit a respective one of the plurality of linear programming feeds having the respective ad inserted into the ad break to customer set top boxes.

22. The system of claim 21, further comprising:
one or more external resources in communication with the video serving component and configured to receive the VAST request and to generate the response to the VAST request.

23. The system of claim 21, further comprising:
an audience measurement service in communication with the video serving component and configured to provide an estimate of impressions that will be delivered during playout of the first ad in response to the VAST request, and to provide a final count of impressions delivered during playout of the first ad in a timely basis after serving the first ad.

24. The method of claim 21, wherein the VAST request includes a plurality of configurable data fields, the generating step further comprising providing, by the video serving component, ad targeting parameters in one of the configurable data fields.

25. The method of claim 21, wherein the VAST request includes a plurality of configurable data fields, the generating step further comprising providing, by the video serving component, workflow rules in one of the configurable data fields for ad selection and serving.

26. In a cable television distribution system having a plurality of linear programming feeds, each linear programming feed includes a plurality of standard-compliant cue messages, each cue message indicating an available spot in the linear programming feed for insertion of an ad and each cue message providing ad insertion parameters for serving the ad into the available spot, a method comprising:

for each cue message detected in each linear programming feed, generating, by a video serving component, a VAST request for an ad to insert into the available spot, the VAST request based upon and incorporating at least some of the cue message information, the VAST request including a plurality of data fields for incorporating the cue message information including the ad insertion parameters for the available spot, at least one of the data fields is configurable and includes an estimate of a number of impressions to be delivered during playout of the ad; and for each linear programming feed, receiving, by the video serving component, a response to the VAST request including identification of a first ad for insertion into the ad spot, the first ad is selected based on the ad insertion parameters, the estimated number of impressions to be delivered, audience targeting criteria, and relevant ad campaign information, and serving the respective identified first ad into the respective linear programming feed.

27. The method of claim 26, further comprising:
the ad campaign information including hyper-targeting criteria specific to a first set top box; and
a first output channel configured to individually address the first set top box for transmitting a first linear programming feed having a first inserted ad that is selected in accord with the hyper-targeting criteria to the first set top box.

28. The method of claim 27, further comprising:
generating, by the video serving component, a verification log identifying which ad ran on which programming feed in which spot;
obtaining, by the video serving component from a first external source, impression data for each served ad; and
generating, by the video server, a verification file that incorporates the verification log, the impression data, and the relevant ad campaign information.

29. The method of claim 27, further comprising:
identifying, to the video serving component from a second external source, the first digital ad.

30. The method of claim 27, the generating step further comprising providing, by the video serving component, ad targeting parameters in one of the configurable data fields.

31. The method of claim 27, the generating step further comprising providing, by the video serving component, workflow rules in one of the configurable data fields for ad selection and serving.

32. An ad insertion apparatus, comprising:
a video serving system having a plurality of input channels, a plurality of output channels, and a processing unit, the video serving system configured to communicate with at least one MVPD cable television distribution network having a plurality of linear programming feeds;
each input channel of the video serving system configured to receive a respective one of the plurality of linear programming feeds and to detect a standard-compliant cue message in the respective one of the plurality of linear programming feeds, the cue message indicating an available ad break for inserting an advertisement in the respective one of the linear programming feeds;
the processing unit configured to, upon detecting the cue message, generate a VAST request for an ad to insert into the ad break based on the cue message, the VAST request including the ad insertion parameters and data fields that are configured to obtain and include audience impression information into the VAST request;
the processing unit further configured to receive, in response to the VAST request, identification of a plurality of ads for insertion into respective ad breaks based on respective ad insertion parameters, audience impression information, and relevant ad campaign information for each of the plurality of linear programming feeds, and to insert the respective identified ad into the respective one of the linear programming feeds; and
each output channel configured to transmit a respective one of the plurality of linear programming feeds having the respective ad inserted or spliced into the ad break back to the MVPD cable television distribution network.

* * * * *